United States Patent

Lewis

[11] Patent Number: 5,996,401
[45] Date of Patent: Dec. 7, 1999

[54] LEAK TEST ADAPTER SYSTEM

[75] Inventor: Keith B. Lewis, King George, Va.

[73] Assignee: The United States of America as represented by the Secretary of the Navy, Washington, D.C.

[21] Appl. No.: 09/140,740

[22] Filed: Aug. 27, 1998

[51] Int. Cl.$^6$ .................................................. G01M 3/04
[52] U.S. Cl. ............................................. 73/49.2; 73/49.8
[58] Field of Search .............................. 73/40, 40.7, 45.4, 73/49.2, 49.3, 49.8, 52

[56] References Cited

U.S. PATENT DOCUMENTS

| | | | |
|---|---|---|---|
| 2,414,113 | 1/1947 | Mapes | 73/37 |
| 3,995,473 | 12/1976 | Flamand et al. | 73/49.2 |
| 5,548,992 | 8/1996 | Hallett et al. | 73/49.2 |

*Primary Examiner*—Hezron Williams
*Assistant Examiner*—Jay L. Politzer
*Attorney, Agent, or Firm*—James B. Bechtel, Esq.

[57] ABSTRACT

A leak test adapter system and method for using same are provided for leak testing a container. A test port is defined in the container to have a cylindrical portion accessible from within the container and a slot accessible from the cylindrical portion and the exterior of the container. A housing fitted over the test port from the exterior of the container defines a chamber in line with the test port. A plug has a first portion sealable within the cylindrical portion of the test port, a second portion extending axially from the first portion for engagement in the slot when the first portion of the plug is sealed in the cylindrical portion, and a third portion extending axially from the second portion. A control rod is attachable to the third portion of the plug. The control rod forms a sealed fit with a portion of the chamber and is capable of movement along its longitudinal axis such that the first portion of the plug can be moved into the container to open the test port and into the cylindrical portion to seal the test port. A fluid passage is disposed in the housing in communication with the chamber between the container and the portion of the chamber forming a seal with the control rod. Fluid can pass through the fluid passage and the chamber about the control rod when moving to and from the test port.

12 Claims, 2 Drawing Sheets

LEAK TEST ADAPTER SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to leak test fixtures, and more particularly to a leak test adapter system that attaches to a container via a test port, allows the container to be filled with a tracer fluid or gas, and allows the container and its test port to be simultaneously tested for leaks.

BACKGROUND OF THE INVENTION

Many types of containers are leak tested by filling the container with a tracer gas and then checking to see if any of the tracer gas is leaking therefrom. To do this, test fixtures are usually required to facilitate the filling of the container with the tracer gas. Once filled, the environment about the container is sampled for leakage of the tracer gas.

A leak test adapter is disclosed in U.S. Pat. No. 5,548,992. Specifically, an adapter body is attached to a container's test port. A stem having a hex end passes through the adapter body and is pressed into a hex socket of a penetration plug filled with a vacuum grease. To fill the container with tracer gas, the stem is pulled away from the container so that the penetration plug is extracted from the test port thereby defining a flow passage through the test port. Once the container is filled, the stem is pushed towards the container to set the penetration plug in the test port. To secure the plug in the test port, the stem is turned to screw the penetration plug into the test port. With the adapter body still in place, the stem is pulled away from the plug as the vacuum grease releases its hold on the hex end of the stem. The adapter body is then removed and a gas detector is used to sample the environment around the container to check for leaking tracer gas.

This adapter has several drawbacks. Since the penetration plug must be withdrawn from the test port to fill the container, the plug is susceptible to being inadvertently pushed back into the test port as tracer gas is forced thereby. Further, since the penetration plug is only attached to the plug by vacuum grease, the plug could fall off the hex end of the stem thereby requiring complete disassembly of the leak test adapter to reposition the plug. Also, since the vacuum grease does not provide a secure coupling, the plug cannot be well-sealed in the test port using, for example, an o-ring. If an o-ring seal were used, the substantial force required to unseat the plug could cause the hex end of the stem to release from the vacuum grease thereby complicating plug removal. Finally, the use of vacuum grease can be messy.

SUMMARY OF THE INVENTION

Accordingly, it is an object of the present invention to provide a leak test adapter system and leak test method for checking the integrity of a container.

Another object of the present invention is to provide a leak test adapter system and leak test method for simultaneously checking the sealing capability of a container and its test port used to fill the container with tracer fluid or gas.

Still another object of the present invention is to provide a leak test adapter system and leak test method in which the container's test port is simply and reliably sealed.

Yet another object of the present invention is to provide a leak test adapter system that facilitates the use of an o-ring seal about a plug used to seal the test port.

Other objects and advantages of the present invention will become more obvious hereinafter in the specification and drawings.

In accordance with the present invention, a leak test adapter system and method are provided for leak testing a container. A test port is defined in the container to have a cylindrical portion accessible from within the container and a slot accessible from the cylindrical portion and the exterior of the container. A housing, attachable to the container and fitted over the test port from the exterior of the container, defines a chamber in line with the test port. A plug has a first portion sealable within the cylindrical portion of the test port, a second portion extending axially from the first portion for engagement in the slot when the first portion of the plug is sealed in the cylindrical portion, and a third portion extending axially from the second portion. A control rod, having a longitudinal axis passing through the chamber, is attachable to the third portion of the plug. The control rod forms a sealed fit with a portion of the chamber and is capable of movement along its longitudinal axis such that the first portion of the plug can be moved into the container to open the test port and into the cylindrical portion to seal the test port with the second portion engaging the slot. A fluid passage is disposed in the housing in communication with the chamber between the container and the portion of the chamber forming a seal with the control rod. Fluid passes through the fluid passage and the chamber about the control rod when moving to and from the test port. The position of the plug determines if the container is open or sealed. After the container is filled with a tracer gas, the housing and control rod can be detached from the container and plug, respectively, and a retainer can be used to positively retain the plug in sealed engagement with the cylindrical portion of the test port.

DETAILED DESCRIPTION OF THE INVENTION

Figure 1:
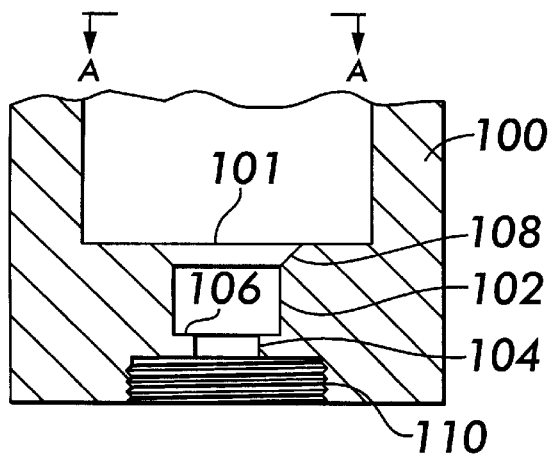
FIG. 1 is a cross-sectional view of a portion of a container depicting its test port configured in accordance with the present invention.
Figure 1A:
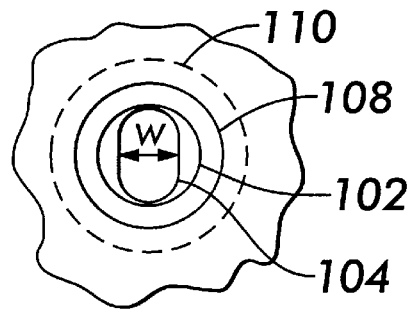
FIG. 1A is a view from the interior of the container taken along line A—A of FIG. 1.

Referring now to the drawings, and more particularly to FIGS. 1 and 1A, a portion of a container 100 to be tested for leaks is configured in accordance with the present invention. Container 100 has a test port 101 formed therein defined by, at a minimum, a cylindrical portion 102 and a slot 104. Cylindrical portion 102 is accessible from the interior portion of container 100. Slot 104 defines a keyway of width W accessible from cylindrical portion 102 and the exterior of container 100. Cylindrical portion 102 and slot 104 are contiguous and coaxially aligned with one another so that an annular shoulder 106 is formed where cylindrical portion 102 and slot 104 meet.

Test port 101 can be optionally tapered outward from cylindrical portion 102 at taper 108 in order to facilitate seating of a plug and its sealing mechanism as will be explained further below. Finally, to facilitate attachment of a leak test adapter housing, a threaded portion 110 can be provided contiguous with slot 104. However, as will become apparent below to one of ordinary skill in the art, other methods of attachment could be used thereby eliminating the need for threaded portion 110.

Figure 2:
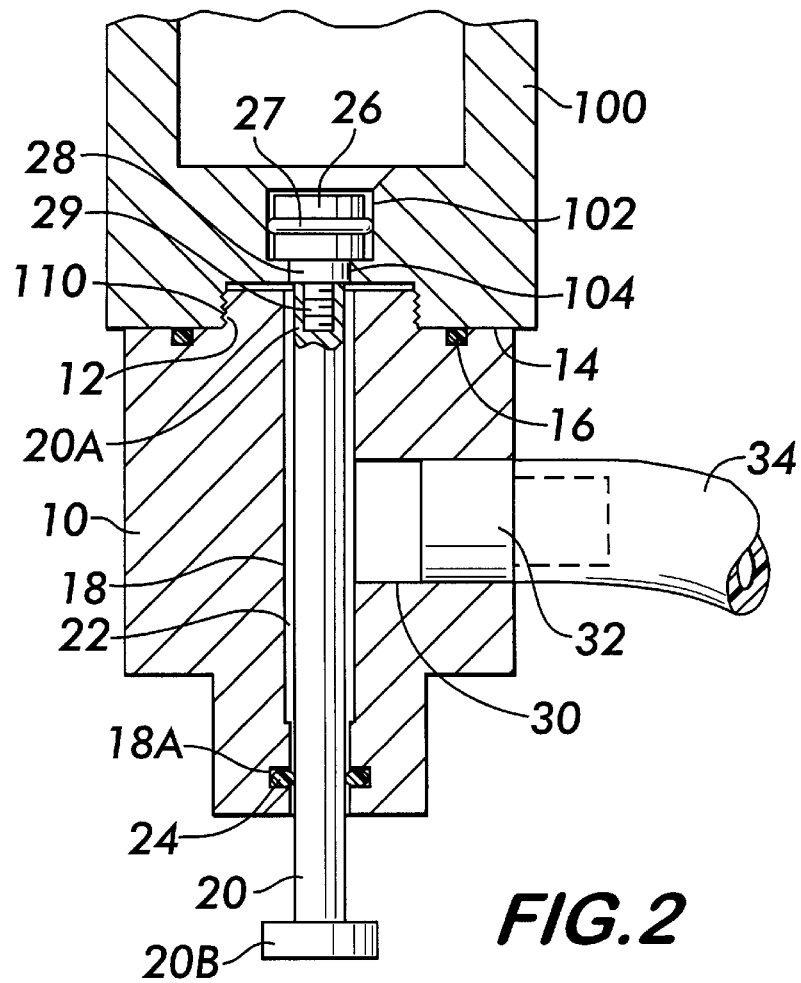
FIG. 2 is a cross-sectional view of the test port portion of the container with an embodiment of the leak test adapter of the present invention attached thereto where the plug is positioned to seal the test port.

Referring now to FIG. 2, the leak test adapter system of the present invention is shown and includes test port 101. A rigid leak test adapter housing 10 is attached to container 100 from the exterior thereof. More specifically, in the illustrated embodiment, housing 10 has a threaded portion 12 for engagement in threaded portion 110 of container 100 until an annular shoulder 14 abuts container 100. To assure a fluid-tight seal, an o-ring 16 can be provided between annular shoulder 14 and container 100.

Housing 10 defines a bore or chamber 18 aligned over and coaxial with cylindrical portion 102 of test port 101. Passing through chamber 18 is a control rod 20 having a diameter that is smaller than width W of slot 104 and smaller that the diameter of chamber 18 such that an annular flow space 22 is defined about rod 20. To assure a fluid-tight seal between rod 20 and housing 10, an o-ring 24 can be provided in an annular recess 18A of chamber 18. O-ring 24 is configured to form a fluid seal but also permit rod 20 to move axially in chamber 18 as will be explained further below.

A plug 26 having a diameter slightly less than cylindrical portion 102 is attached to rod 20. Accordingly, plug 26 is first placed in container 100 for installation in cylindrical portion 102. The sealing mechanism for plug 26 in the illustrated embodiment is an o-ring 27 provided circumferentially about plug 26 to form a tight seal with cylindrical portion 102. In accordance with the present invention, plug 26 is attachable to and detachable from rod 20. Specifically, plug 26 has a key 28 extending therefrom that cooperates with slot 104 when plug 26 is properly positioned in cylindrical portion 102. Key 28 is configured for non-rotatable engagement in slot 104. Key 28 has a threaded post 29 extending therefrom sized to fit through slot 104 when plug 26 is positioned in cylindrical portion 102 with key 28 in slot 104. Rod 20 is internally threaded at 20A to engage threaded post 29. Alternatively, the post extending from plug 26 could be internally threaded and rod 20 could be terminated in a threaded post for engagement in such an internally threaded post. At the opposite end of rod 20, a knob 20B can be provided to facilitate the turning action of rod 20 needed to attach or detach same from plug 26. Knob 20B also serves as an axial travel stop that cooperates with housing 10. Knob 20B can be made integral with rod 20 as shown or could be attachable to rod 20 to facilitate assembly.

A fluid passage 30 is formed in housing 10 to couple annular flow space 22 with the exterior of housing 10. Typically, a pipe fitting 32 is coupled to fluid passage 30 and a fill/vacuum house 34 is coupled to fitting 32. The types of fitting 32 and hose 34 can be selected based upon application requirements.

Figure 3:
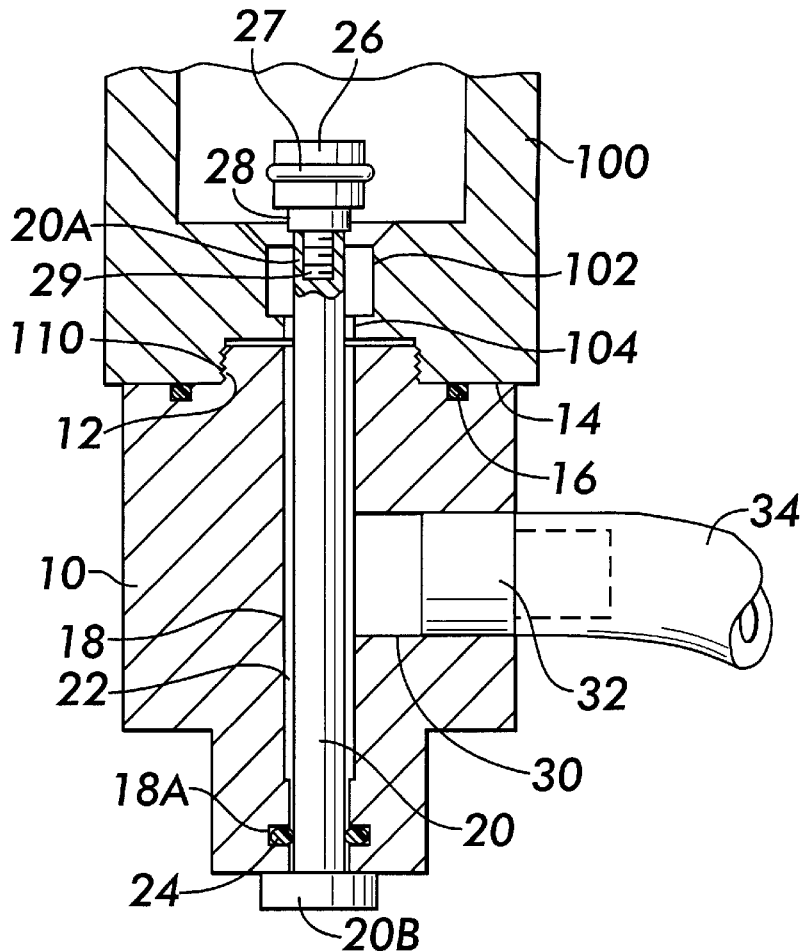
FIG. 3 is a cross-sectional view of the test port portion of the container with the leak test adapter attached thereto where the plug is positioned to open the test port.

In operation, the leak test adapter system is initially configured as illustrated in FIG. 2. That is, with plug 26 in cylindrical portion 102 so that key 28 is engaged in slot 104, rod 20 is screwed onto threaded post 29 and threaded portion 12 is screwed into threaded portion 110. The keyed engagement of key 28 in slot 104 assures that plug 26 will not rotate so that rod 20 can be positively and securely attached to plug 26. When it is time to fill container 100 with a tracer fluid or gas, rod 20 is pushed axially along chamber 18 so that plug 26 is displaced from cylindrical portion 102 as illustrated in FIG. 3. This action thus opens a pathway between the interior of container 100 and fitting 32 that is defined by test port 101, annular flow space 22 and fluid passage 30. Note that container 100 can be evacuated before being filled with a tracer gas. If evacuation is necessary, a vacuum (not shown) is coupled to hose 34 with plug 26 in its unseated position shown in FIG. 3. After evacuation is complete, a tracer gas supply (not shown) is coupled to hose 34 for filling container 100.

Once container 100 is filled and pressurized to a desired pressure, rod 20 is pulled axially to draw plug 26 into seated engagement in cylindrical portion 102. Rod 20 can be rotated as necessary until key 28 aligns with slot 104 at which point plug 26 can be pulled into sealed engagement with cylindrical portion 102. Typically, rod 20 is pulled until plug 26 contacts annular shoulder 106 as illustrated in FIG. 2. As a result, plug 26 is sealed in cylindrical portion 102 by o-ring 27 and held non-rotatably therein by means of key 28 in slot 104. The pressure in container 100 tends to keep plug 26 in its sealed position. Accordingly, rod 20 and housing 10 can be disengaged from plug 26 and container 100, respectively, without disturbing the seal of test port 101. That is, the configuration of test port 101 and plug 26 serves to passively retain plug 26 in its sealed position when container 100 is pressurized.

Figure 4:
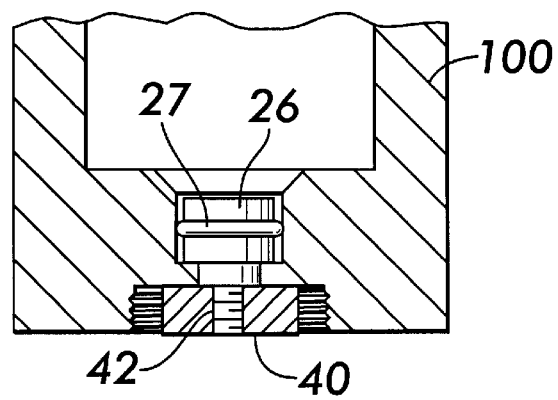
FIG. 4 is a cross-sectional view of the test port portion of the container with the plug sealed therein and held in place by a retainer.

To actively or positively retain plug 26 in its sealed position, a retaining cap or nut 40 can be attached to threaded post 29 as shown in FIG. 4. Specifically, an internally threaded portion 42 of nut 40 can engage threaded post 29 once rod 20 and housing 10 have been removed. Threaded post 29 and nut 40 can be sized to fit within the depth of threaded portion 110 so as not to protrude beyond the exterior surface plane of container 100. With nut 40 so attached, container 100 to include test port 101 can be examined for leaks as the environment therearound is sampled using a detector sensitive to the tracer gas or fluid in container 100.

When the leak test is complete, nut 40 can be removed and housing 10/rod 20 can be reattached to container 100/plug 26. Test port 101 can be reopened and container 100 can then be evacuated to remove the tracer gas or fluid. If necessary, container 100 can then be refilled for storage or use purposes. Once refilled, housing 10/rod 20 are detached and nut 40 can be reattached as described above to keep test port 101 sealed.

The advantages of the present invention are numerous. The leak test adapter system and method allows a container and its test port to be leak tested without disturbing the seal in the test port. The system's plug is simply, positively and reliably engaged/disengaged thereby eliminating the chance of inadvertent plug detachment.

Although the invention has been described relative to a specific embodiment thereof, there are numerous variations and modifications that will be readily apparent to those skilled in the art in light of the above teachings. For example, housing 10 could incorporate a flange attachable to container 100 by screws. Taper 108 could be eliminated if o-ring 27 were not necessary to seal plug 26 in cylindrical portion 102. Key 28 and slot 104 could be shaped differently (e.g., triangular, square, pentagon, etc.) as long as their engagement inhibited axial rotation of key 28 while permitting passage of the threaded post and control rod. Thus, it is therefore to be understood that, within the scope of the appended claims, the invention may be practiced other than as specifically described.

What is claimed as new and desired to be secured by Letters Patent of the United States is:

1. A leak test adapter system for leak testing a container, comprising:

a test port defined in said container, said test port having a cylindrical portion accessible from within said container and a slot accessible from said cylindrical portion and the exterior of said container;

a housing attachable to said container and fitted over said test port from the exterior of said container, said housing defining a chamber in line with said test port;

a plug having a first portion sealable within said cylindrical portion of said test port, a second portion extending axially from said first portion for engagement in said slot when said first portion of said plug is sealed in said cylindrical portion, and a third portion extending axially from said second portion;

a control rod having a longitudinal axis passing through said chamber of said housing, said control rod attachable to said third portion of said plug, said control rod forming a sealed fit with a portion of said chamber and capable of movement along said longitudinal axis such that said first portion of said plug can be moved into said container to open said test port and into said cylindrical portion to seal said test port with said second portion engaging said slot; and a fluid passage disposed in said housing and in communication with said chamber between said container and said portion of said chamber wherein fluid passes through said fluid passage and said chamber about said control rod when moving to and from said test port.

2. A leak test adapter as in claim 1 further comprising an o-ring disposed circumferentially about said first portion of said plug.

3. A leak test adapter as in claim 1 wherein said third portion of said plug and said control rod are in threaded engagement when attached to one another.

4. A leak test adapter as in claim 3 further comprising a retainer capable of engagement with said third portion of said plug when said housing and said control rod are detached from said container and said third portion of said plug, respectively, said retainer retaining said first portion of said plug in said cylindrical portion of said test port when engaged with said third portion of said plug.

5. A leak test adapter as in claim 1 wherein said test port further defines a tapered portion contiguous with said cylindrical portion, said tapered portion tapering outward to a larger diameter than said cylindrical portion.

6. A leak test adapter system for leak testing a container, comprising:

a test port defined in said container, said test port having a cylindrical portion accessible from within said container and a slot accessible from said cylindrical portion and the exterior of said container;

a rigid housing attachable to and sealable to said container over said test port from the exterior of said container, said housing defining an open-ended chamber in line with said test port;

a plug sealable within said cylindrical portion of said test port;

a key attached to and extending axially from said plug for non-rotatable engagement in said slot when said plug is sealed in said cylindrical portion;

a threaded post attached to and extending axially from said key and passable through said slot when said key is engaged in said slot;

a control rod having a longitudinal axis passing through said chamber of said housing, said control rod attachable to said threaded post, said control rod forming a sealed fit with a portion of said chamber and capable of movement along said longitudinal axis such that said plug can be moved into said container to open said test port and into said cylindrical portion to seal said test port;

a fluid passage disposed in said housing and in communication with said chamber between said container and said portion of said chamber wherein fluid passes through said fluid passage and said chamber about said control rod when moving to and from said test port; and a retainer attachable to said threaded post when said housing and said control rod are detached from said container and said threaded post, respectively, said retainer securely retaining said plug in said cylindrical portion of said test port with said key engaged in said slot.

7. A leak test adapter as in claim 6 further comprising an o-ring disposed circumferentially about said plug.

8. A leak test adapter as in claim 6 wherein said test port further defines a tapered portion contiguous with said cylindrical portion, said tapered portion tapering outward to a larger diameter than said cylindrical portion.

9. A method for leak testing a container comprising the steps of:

providing a test port in said container, said test port having a cylindrical portion accessible from within said container and a slot accessible from said cylindrical portion and the exterior of said container;

providing a plug sealable within said cylindrical portion, a key attached to and extending axially from said plug for non-rotatable engagement in said slot, and a threaded post attached to and extending axially from said key and passable through said slot;

placing said plug with said key and said threaded post attached thereto in said container;

inserting said threaded post through said cylindrical portion and said slot while positioning said key to engage said slot wherein said plug is sealed within said cylindrical portion of said test port;

fitting a housing to said container over said test port from the exterior of said container, said housing defining a chamber in line with said test port;

attaching a control rod to said threaded post, said control rod having a longitudinal axis passing through said chamber of said housing and forming a sealed fit with a portion of said chamber, said control rod capable of movement along said longitudinal axis such that said plug can be moved into said container to open said test port and into said cylindrical portion of said test port to seal said test port;

pushing on said control rod to displace said plug from said cylindrical portion of said test port;

supplying a fluid under pressure to said test port via a fluid passage disposed in said housing and in communication with said chamber between said container and said portion of said chamber wherein said fluid passes through said fluid passage and said chamber about said control rod when moving to said test port, wherein said container is filled with said fluid;

aligning said key for engagement in said slot;

pulling on said control rod to draw said key into said slot and said plug into sealing engagement with said cylindrical portion of said test port after said container is filled with said fluid;

detaching said housing from said container and said control rod from said plug; and sampling the environment about said container to determine if said fluid is leaking into the environment.

10. A method according to claim 9 further comprising the step of attaching a retainer to said threaded post after said housing and said control rod are detached from said container and said threaded post, respectively, wherein said plug is positively retained in said cylindrical portion of said test port.

11. A method according to claim 10 wherein said steps of attaching said control rod and attaching said retainer are accomplished through threaded engagement of said control rod with said threaded post and said retainer with said threaded post, respectively.

12. A method according to claim 9 further comprising, just prior to said step of supplying, the step of evacuating said container via said test port wherein any contained fluid in said container passes through said test port, said chamber about said control rod and said fluid passage.

* * * * *